United States Patent
Rysdyk

(10) Patent No.: US 10,096,251 B2
(45) Date of Patent: Oct. 9, 2018

(54) SYSTEMS AND METHODS FOR ESTABLISHING A FLIGHT PATTERN ADJACENT TO A TARGET FOR A VEHICLE TO FOLLOW

(71) Applicant: InSitu, Inc., a subsidiary of the Boeing Company, Bingen, WA (US)

(72) Inventor: Rolf Rysdyk, Bingen, WA (US)

(73) Assignee: Insitu, Inc., Bingen, WA (US)

( * ) Notice: Subject to any disclaimer, the term of this patent is extended or adjusted under 35 U.S.C. 154(b) by 145 days.

(21) Appl. No.: 15/381,342

(22) Filed: Dec. 16, 2016

(65) Prior Publication Data
US 2018/0174470 A1 Jun. 21, 2018

(51) Int. Cl.
| | | |
|---|---|---|
| G05D 1/00 | (2006.01) | |
| G05D 1/10 | (2006.01) | |
| G08G 5/00 | (2006.01) | |
| B64C 39/02 | (2006.01) | |
| G03B 15/00 | (2006.01) | |

(52) U.S. Cl.
CPC ......... *G08G 5/0034* (2013.01); *B64C 39/024* (2013.01); *G03B 15/006* (2013.01); *G05D 1/0011* (2013.01); *G05D 1/0094* (2013.01); *G05D 1/101* (2013.01); *G08G 5/006* (2013.01); *G08G 5/0013* (2013.01); *G08G 5/0039* (2013.01); *B64C 2201/127* (2013.01); *B64C 2201/146* (2013.01)

(58) Field of Classification Search
CPC ..... G05D 1/0094; G05D 1/101; G08G 5/0034
See application file for complete search history.

(56) References Cited

U.S. PATENT DOCUMENTS

| | | | |
|---|---|---|---|
| 8,831,284 B2* | 9/2014 | Thueux | G06T 7/262 382/103 |
| 2004/0092258 A1* | 5/2004 | Hibbs | H04B 7/18504 455/431 |

OTHER PUBLICATIONS

McGee, Timothy Garland: "Autonomous Search and Surveillance with Small Fixed Wing Aircraft"; University of California at Berkely. <https://pdfs.semanticscholar.org/d098/bcfe2844eab2422a5e8b91694e57162dc8e3.pdf> (Year: 2006).*
J. Dennis Lawrence, 1972, Dover Press, A Catalog of Special Plane Curves, p. 49-50 & p. 120-126.
Rolf Rysdyk, Course and Heading Changes in Significant Wind, Journal of Guidance, Control, and Dynamics, 2007, vol. 33, Nr.4, pp. 1311-1312.

* cited by examiner

*Primary Examiner* — Anshul Sood
(74) *Attorney, Agent, or Firm* — McDonnell Boehnen Hulbert & Berghoff LLP

(57) ABSTRACT

An example method of establishing a flight pattern adjacent to a target for an aerial vehicle to follow includes determining a stand-off distance to the target. The stand-off distance indicates a distance from the target at a point along the flight pattern. The example method also includes generating the flight pattern in a form of a conchoidal transformation of a lemniscate based on the stand-off distance.

20 Claims, 11 Drawing Sheets

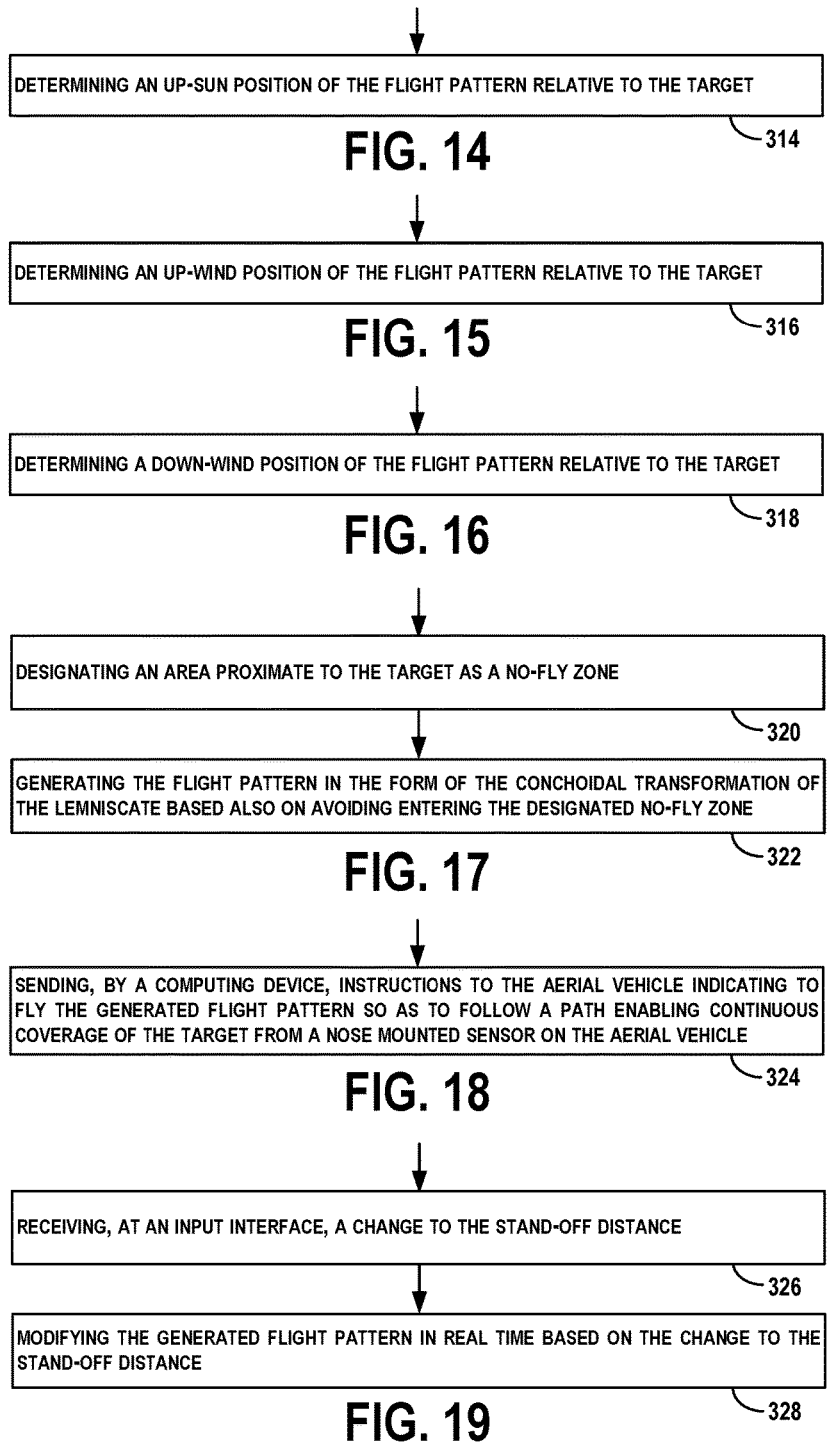

SYSTEMS AND METHODS FOR ESTABLISHING A FLIGHT PATTERN ADJACENT TO A TARGET FOR A VEHICLE TO FOLLOW

FIELD

The present disclosure relates generally to systems and methods for establishing a flight pattern adjacent to a target for a vehicle to follow, and more particularly to, methods for determining a stand-off flight pattern for an aerial vehicle, for example.

BACKGROUND

Guidance, navigation, and control (GNC) systems for aerial vehicles (AV) include avionics on the AV and associated ground support systems. Guidance of the AV is often controlled by factors that accommodate payload of the AV, and any information gathering tasks of the AV. For some tasks, it can be useful to have the AV maintain a stand-off pattern or other pattern that is in relation to a target. This may be to accommodate payload image quality, such as enabling cameras on the AV to obtain high quality images from a desired perspective.

Uncertainties and potential faults in guidance and navigation algorithms can cause problems with maintaining positioning of the AV in the pattern. In addition, methods of determining a target's position and velocity (or relative position and velocity with respect to the AV) are based on the AV positioning information, and thus, accurate position information may be needed.

Real-time data of a position and velocity of the target, and accurately knowing the position and velocity of the AV are needed to determine a pattern for the AV to follow such that the target remains in constant view of the AV. Existing stand-off patterns for fixed wing air vehicles, or any vehicles which are unable or ineffective at hover or position holding, often are difficult to adapt to changing conditions due to preset parameters, and changing the amount of target exposure to payload coverage can be difficult. What is needed is a predictable and consistent pattern determination method for the AV to follow, in relation to the target, which also can be updated as the position of the target is updated.

SUMMARY

In one example, a method of establishing a flight pattern adjacent to a target for an aerial vehicle to follow is described. The method comprises determining a stand-off distance to the target, and the stand-off distance indicates a distance from the target at a point along the flight pattern. The method also comprises generating the flight pattern in a form of a conchoidal transformation of a lemniscate based on the stand-off distance.

In another example, a non-transitory computer readable storage medium having stored therein instructions, that when executed by a system having one or more processors, causes the system to perform functions of establishing a flight pattern adjacent to a target for an aerial vehicle to follow is described. The functions comprise determining a stand-off distance to the target, and the stand-off distance indicates a distance from the target at a point along the flight pattern. The functions also comprise generating the flight pattern in a form of a conchoidal transformation of a lemniscate based on the stand-off distance.

In still another example, a computing device is described. The computing device comprises a communication interface for receiving a stand-off distance to a target, and the stand-off distance indicates a distance from the target at a point along a flight pattern adjacent to the target for an aerial vehicle to follow. The computing device also comprises one or more processors for executing instructions stored on data storage to generate the flight pattern in a form of a conchoidal transformation of a lemniscate based on the stand-off distance.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 14 shows a flowchart of another example method for use with the method shown in FIG. 11, according to an example embodiment.

FIG. 15 shows a flowchart of another example method for use with the method shown in FIG. 11, according to an example embodiment.

FIG. 16 shows a flowchart of another example method for use with the method shown in FIG. 11, according to an example embodiment.

FIG. 17 shows a flowchart of another example method for use with the method shown in FIG. 11, according to an example embodiment.

FIG. 18 shows a flowchart of another example method for use with the method shown in FIG. 11, according to an example embodiment.

FIG. 19 shows a flowchart of another example method for use with the method shown in FIG. 11, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Information gathering of targets or target locations or the observation of a landmark (i.e., to gather information for navigation, such as relative location of a vehicle to the landmark) can be performed by vehicles executing an observance maneuver proximal to the target or landmark. Target exposure and image quality can affect quality of information. Thus, it is desirable to guide vehicles to accommodate payload and information gathering tasks. For some tasks, it is useful to have the vehicle maintain a stand-off pattern. This may be to accommodate payload image quality, for example. Stand-off implies that the vehicle not over fly or circle the target or landmark. Examples include remaining down-wind of a target to reduce vehicle noise signature or enable bio-sensing, remaining up-sun of a target for better image exposure, and remaining up-wind of the target in dusty or smoky environments.

Within examples described below, numerous flight patterns are described for maneuvering proximal to a target based on varied considerations.

Figure 1:
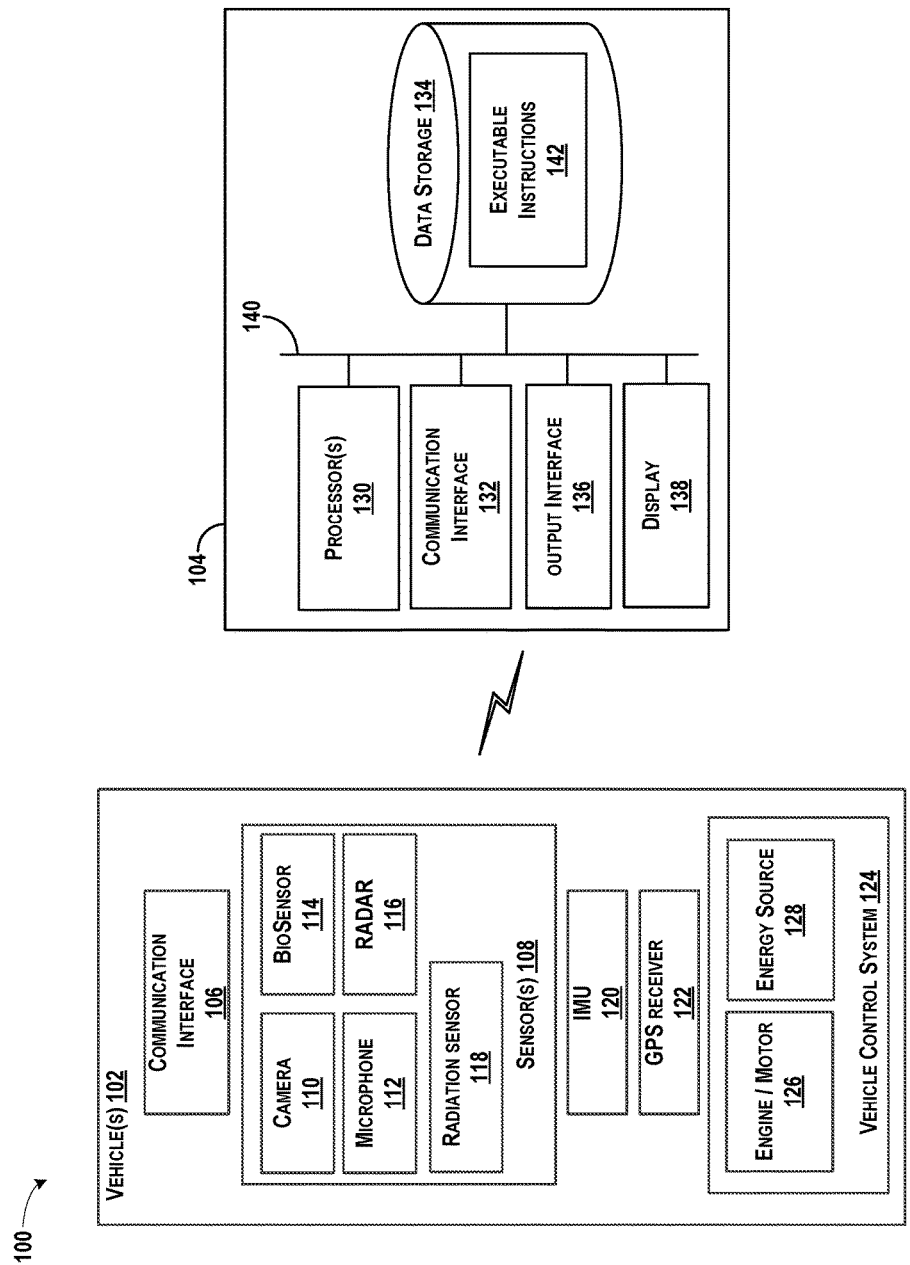
FIG. 1 is a block diagram of a system, according to an example embodiment.

Referring now to FIG. 1, a block diagram of a system 100 is illustrated, according to an example embodiment. The system 100 includes one or more vehicle(s) 102 in communication with a computing device 104.

The vehicle(s) 102 may include an autonomous vehicle and may take the form of many different types of vehicles including an aerial vehicle including a winged aerial vehicle, an un-manned aerial vehicle (UAV), a drone, a rotorcraft device, a multicopter, an autonomously driven vehicle, a land vehicle, a water vehicle, a water submersible vehicle, among other possibilities.

The vehicle(s) include a communication interface 106 that may be a wireless interface and/or one or more wireline interfaces that allow for both short-range communication and long-range communication to one or more networks or to one or more remote devices, such as to the computing device 104. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

The vehicle(s) 102 also include sensors 108, which can include any number or type of sensors including a camera 110, a microphone 112, a biosensor 114, and a RADAR 116, and a radiation sensor 118. The sensors 108 allow the vehicle(s) 102 to sense objects in the environment. As one example, the microphone 112 includes an auditory-sensor to identify an auditory signature or auditory level in the environment. As another example, the RADAR 116 can determine a distance to an object or, sense the presence of, and/or determine the distance to the object. The RADAR 116 can also include a light detection and ranging (LIDAR) system, laser detection and ranging (LADAR) system, and/or an infrared or forward-looking infrared (FLIR) system, among other possibilities. The radiation sensor 118 can detect or identify a radiation level in the atmosphere or environment, for example.

The camera 110 can include an imaging system, such as a video camera, to capture image data from the environment. As a specific example, charge-coupled device (CCD) cameras or complementary metal-oxide-semiconductor (CMOS) cameras can be used, among other possibilities. Thus, the camera 110 can include a visual camera. The camera 110 can also include a night-vision camera and/or a forward looking infrared radar device or an infrared camera. The camera 110 may capture imagery of the environment and compare the imagery to what is expected given a current estimated position to help with navigation.

The microphone 112 may be configured to capture sound from the environment.

The biosensor 114 (or biological sensor) includes a transducer and a biological element that may be an enzyme, an antibody or a nucleic acid that interacts with an analyte being tested and a biological response is converted into an electrical signal by the transducer. The biosensor 114 may detect certain chemicals in the environment, for example. The biosensor 114 may also take the form of a temperature sensor as well.

The vehicle(s) 102 is shown to include additional components including an inertial measurement unit (IMU) 120 that can include both an accelerometer and a gyroscope, which may be used together to determine an orientation of the vehicle(s) 102. In particular, the accelerometer can measure the orientation of the vehicle(s) 102 with respect to earth, while the gyroscope measures the rate of rotation around an axis. The IMU 120 may take the form of or include a miniaturized MicroElectroMechanical System (MEMS) or a NanoElectroMechanical System (NEMS). Other types of IMUs may also be utilized. The IMU 120 may include other sensors, in addition to accelerometers and gyroscopes, which may help to better determine position and/or help to increase autonomy of the vehicle(s) 102. Two examples of such sensors are magnetometers and pressure sensors (or barometer), which may be used to determine the attitude and altitude of the vehicle(s) 102.

The vehicle(s) 102 also may include a global position system (GPS) receiver 122 configured to provide data that is typical of well-known GPS systems, such as the GPS coordinates of the vehicle(s) 102. Such GPS data may be utilized by the vehicle(s) 102 for various functions, such as to navigate to a target position.

The vehicle(s) 102 also may include a vehicle control system 124 including an engine/motor 126 and an energy source 128. Depending on the form of the vehicle(s) 102, various engines and energy sources can be used. An example energy source 128 can include fuel or batteries for providing power to the vehicle(s) 102. The engine/motor 126 can be a combustion engine or an electric engine to name a few examples.

The various components of the vehicle(s) 102 including the communication interface 106, the sensor(s) 108, the IMU 120, the GPS receiver 122, the vehicle control system 124, among others may be referred to as assets of the vehicle(s) 102 that provide the vehicle(s) 102 with capabilities to perform certain tasks. Various vehicles can have a different combination of assets depending on a configuration and use of the vehicles.

The computing device 104 has a processor(s) 130, and also a communication interface 132, data storage 134, an output interface 136, and a display 138 each connected to a communication bus 140. The computing device 104 may also include hardware to enable communication within the computing device 104 and between the computing device 104 and other devices (not shown). The hardware may include transmitters, receivers, and antennas, for example.

The communication interface 132 may be a wireless interface and/or one or more wireline interfaces that allow for both short-range communication and long-range communication to one or more networks or to one or more remote devices. Such wireless interfaces may provide for communication under one or more wireless communication protocols, such as Very High Frequency (VHF) Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 132 may be configured to receive input data from one or more devices, and may also be configured to send output data to other devices.

The communication interface 132 may also include a user-input device, such as a keyboard or mouse, for example. In some examples, the communication interface 132 receives information input by a user, such as a stand-off distance for the vehicle(s) 102 to follow respective to a target, for example.

The data storage 134 may include or take the form of one or more computer-readable storage media that can be read or accessed by the processor(s) 130. The computer-readable storage media can include volatile and/or non-volatile storage components, such as optical, magnetic, organic or other memory or disc storage, which can be integrated in whole or in part with the processor(s) 130. The data storage 134 is considered non-transitory computer readable media. In some embodiments, the data storage 134 can be implemented using a single physical device (e.g., one optical, magnetic, organic or other memory or disc storage unit), while in other embodiments, the data storage 134 can be implemented using two or more physical devices.

The data storage 134 thus is a non-transitory computer readable storage medium, and executable instructions 142 are stored thereon. The instructions 142 include computer executable code. When the instructions 142 are executed by the processor(s) 130, the processor(s) 130 are caused to perform functions. Such functions include establishing a flight pattern adjacent to a target for an aerial vehicle to follow. In addition, such functions may also include determining a stand-off distance to the target that indicates a distance from the target at a point along the flight pattern, and generating the flight pattern in a form of a conchoidal transformation of a lemniscate based on the stand-off distance. Details of the example functions are described below.

The processor(s) 130 may be a general-purpose processor or a special purpose processor (e.g., digital signal processors, application specific integrated circuits, etc.). The processor(s) 130 may receive inputs from the communication interface 132, and process the inputs to generate outputs that are stored in the data storage 134 and output to the display 138. The processor(s) 130 can be configured to execute the executable instructions 142 (e.g., computer-readable program instructions) that are stored in the data storage 134 and are executable to provide the functionality of the computing device 104 described herein.

The output interface 136 outputs information to the display 138 or to other components as well. Thus, the output interface 136 may be similar to the communication interface 132 and can be a wireless interface (e.g., transmitter) or a wired interface as well. The output interface 136 may send instructions to the vehicle(s) 102 indicating to fly a generated flight pattern so as to follow a path enabling continuous coverage of a target from a nose mounted sensor on the vehicle(s) 102, for example.

The computing device 104 may be included within a number of different vehicles, including aircraft, automobiles, or boats, for example. Alternatively, the computing device 104 may be included in a ground station that communicates with and controls different vehicles.

Figure 2:
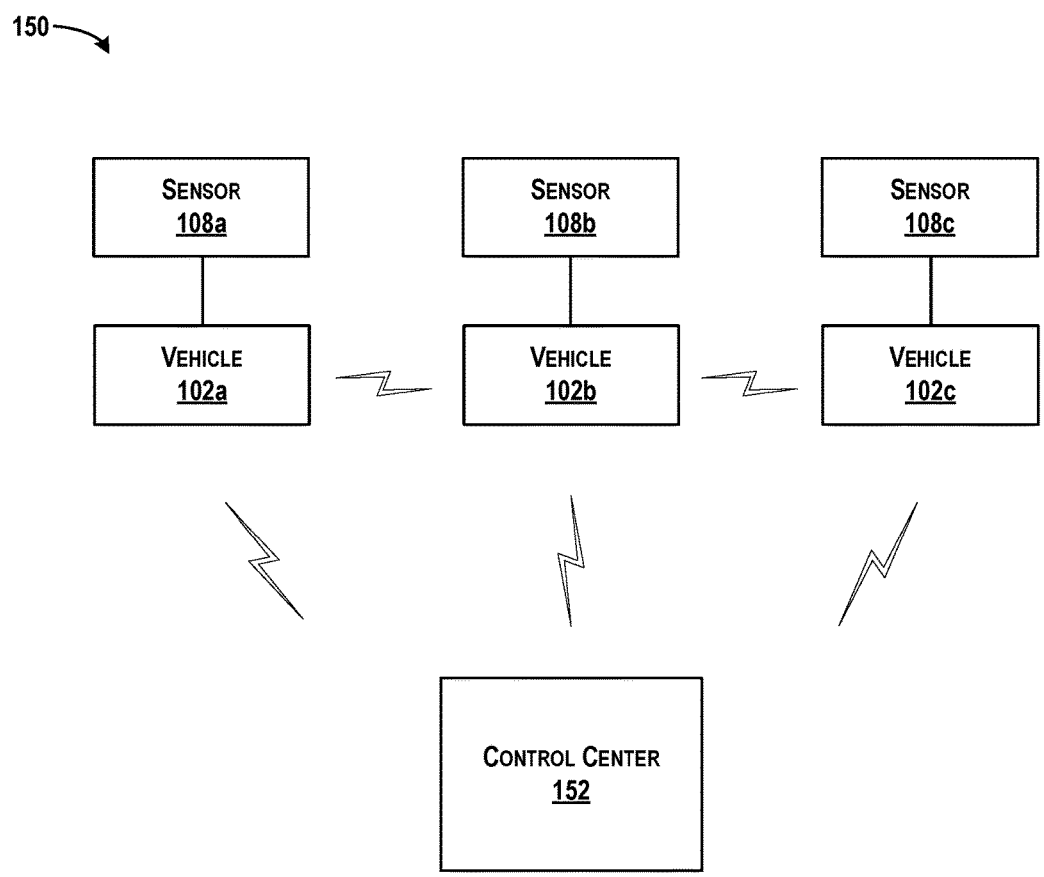
FIG. 2 illustrates an example system including multiple vehicles, according to an example embodiment.

FIG. 2 illustrates an example system 150 including vehicle(s) 102*a-c* that may each include sensor(s) 108*a-c*. The vehicle(s) 102*a-c* may include different sensors, or the same sensors depending on an application or mission. The system 150 further includes a control center 152. The vehicle(s) 102*a-c* have a communication interface 106 enabling the vehicle(s) 102*a-c* to communicate wirelessly with the control center 152. The control center 152 can notify the vehicle(s) 102*a-c* to perform tasks as needed.

An example task includes the vehicle(s) 102*a-c* maneuvering within a stand-off pattern to perform stand-off observation of a target. For example, the vehicle(s) 102*a-c* may include cameras and can fly an orbit about a target location in the event that the vehicle(s) 102*a-c* are unable to hover. An example pattern may include a 3000 feet radius, at about a 3000 feet altitude. However, in some instances, it may be desirable for the vehicles(s) 102*a-c* not to orbit around the target location, but still want to have a view of the target location or the target at all times during the flight pattern.

An example flight pattern that does not orbit a target location, but allows for a view of the target location or the target at all times during the flight pattern include a figure eight pattern in which the vehicle(s) 102*a-c* always turn toward target.

Figure 3:
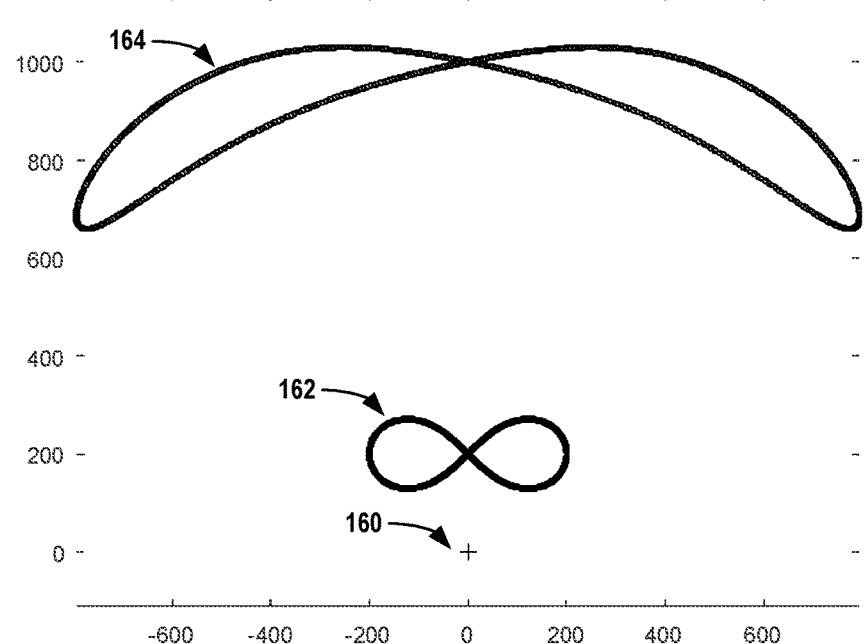
FIG. 3 illustrates example flight patterns for the vehicle(s) to follow along an x-y coordinate system, according to an example embodiment.

FIG. 3 illustrates example flight patterns for the vehicle(s) 102 to follow along an x-y coordinate system, according to an example embodiment. In FIG. 3, a target 160 (or a target location) is shown, and a figure eight pattern 162 can be implemented on one side of the target 160 so that the vehicle(s) do not orbit the target 160. To generate the figure eight pattern 162, four waypoints in rectangle are selected and the vehicle(s) 102 fly from point-to-point. Using the figure eight pattern 162 can offer advantages, or may provide undesirable transitions from point-to-point in which the vehicle(s) 102 are required to make sharp turns.

The figure eight pattern 162 may be referred to as a lemniscate pattern.

FIG. 3 also illustrates an example flight pattern that modifies a shape of the figure eight pattern 162 in a customized manner resulting in a flight pattern 164 in a form of a conchoidal transformation of a lemniscate. As shown in FIG. 3, the flight pattern 164 in the form of the conchoidal transformation of the lemniscate resembles a flattened figure-eight pattern.

The lemniscate is a figure eight pattern similar to the symbol for infinity. Specifically, the Lemniscate of Bernoulli is a flattened figure eight pattern similar to the infinity symbol.

A conchoid is a pair of mathematical curves derived from an existing curve C, a line L, and a point O, as follows. Let O be a fixed point, and let line L be a line through O intersecting curve C at point Q. The conchoid of curve C with respect to point O are the loci of points P1 and P2 on line L such that $$P_1Q = P_2Q = k \quad \text{Equation (1)}$$

where k is a constant. This transformation can be used as follows: point O is the target 160, line L is a line of sight from the vehicle(s) 102 to the target 160, curve C is the lemniscate, and the conchoidal transformation is the flight pattern 164.

The line L can be described by $$y - y_0 = m(x - x_0) \quad \text{Equation (2)}$$

where m is the slope of the line.

Then, the parametric expressions for the conchoidal transformation are given by:

$$x = f(s) \quad \text{Equation (3)}$$

$$y = g(s) \quad \text{Equation (4)}$$

$$m = \frac{g(s) - y_0}{f(s) - x_0} \quad \text{Equation (5)}$$

$$x_p = f(s) \pm \frac{k}{\sqrt{1 + m^2}} \quad \text{Equation (6)}$$

$$y_p = g(s) \pm m \times \frac{k}{\sqrt{1 + m^2}} \quad \text{Equation (7)}$$

The Lemniscate of Bernoulli can be expressed as a function of an independent parameter "s" as follows:

$$f(s) = a \times \frac{\cos s}{1 + \sin^2 s} \quad \text{Equation (8)}$$

$$g(s) = a \times \frac{\sin s \cos s}{1 + \sin^2 s} \quad \text{Equation (9)}$$

where $s \in [0, 2\pi)$ and a is a sizing constant.

Another example of the figure eight pattern 162 is the Lemniscate of Gerono which is a more traditional figure eight pattern that is less flat, which for the airvehicle translates to a milder course reversal, and its formulation is simpler than the Lemniscate of Bernoulli. However, the greater variation in distance from the target may be undesirable. The Lemniscate of Gerono is formulated parametrically as follows:

$$f(s) = a \cos s \quad \text{Equation (10)}$$

$$g(s) = a \sin s \cos s \quad \text{Equation (11)}$$

The flight pattern 164 may, for example, follow a lemniscate of Bernouilli or a lemniscate of Gerono. The conchoidal transformation of the figure eight results in a smooth pattern that can cover a wide angle (180° degrees, for example) of target exposure. The flight pattern 164 pattern can be parametrically defined, as shown above, which has advantages for guidance and navigation formulation. A parametric formulation is able to accommodate a system operator with a wide angle stand-off coverage of a target. A smooth non-heuristic formulation for the flight pattern 164 can be shaped with a few parameters, which allows the vehicle(s) 102 to follow a path that accommodates continuous coverage of the target 160 from a nose mounted sensor.

A combination of the lemniscate pattern and the conchoidal transformation leads to parametric expressions for the flight pattern 164 as follows. Of the two conchoidal curves, the flight pattern can be limited to the 'far' one. Therefore, answers can be restricted to the positive functions. The constants a and k are known a-priori from desired geometry. Using the lemniscate of Bernoulli, coordinates of the flight pattern 164 are defined as follows:

$$x_p(s) = \frac{a \cos s}{1 + \sin^2 s} + \frac{k}{\sqrt{1 + m^2}} \quad \text{Equation (12)}$$

$$y_p(s) = \frac{a \sin s \cos s}{1 + \sin^2 s} + m \times \frac{k}{\sqrt{1 + m^2}} \quad \text{Equation (13)}$$

where $$m = \frac{a \cos s \sin s - y_0(1 + \sin^2 s)}{a \cos s - x_0(1 + \sin^2 s)} \quad \text{Equation (14)}$$

The above equations (12)-(14) determine coordinates of the flight pattern 164 in an analytically closed form solution, which makes for a straightforward and easily verifiable software code that avoids ad-hoc constructs.

Figure 4:
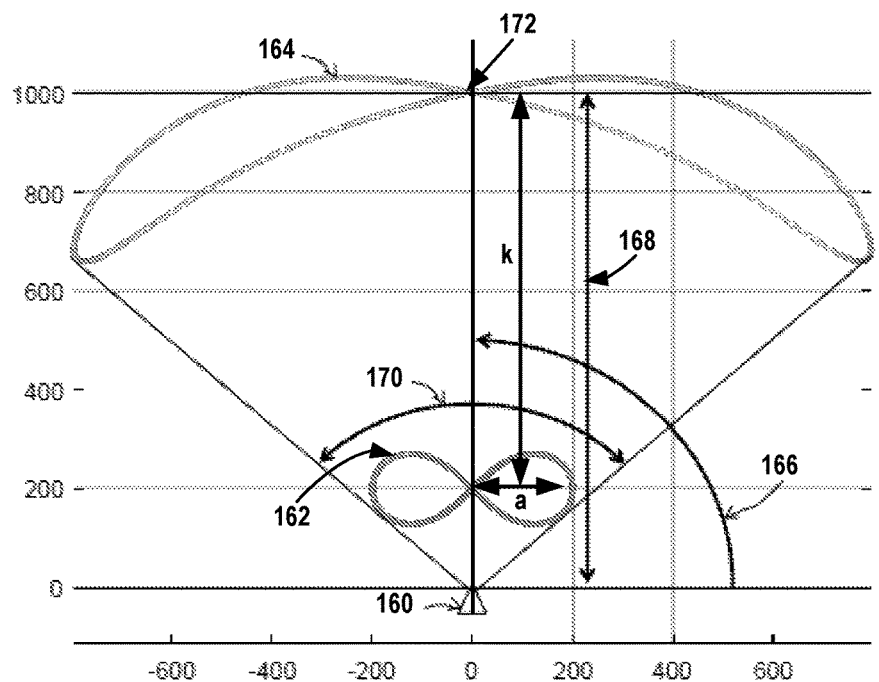
FIG. 4 illustrates an example determination of the flight pattern, according to an example embodiment.

FIG. 4 illustrates an example determination of the flight pattern 164, according to an example embodiment. Initially, the target 160, or target location, is selected. Following, an orientation 166 of the flight pattern 164 relative to the target 160 is selected. The orientation 166 indicates on which side the vehicle(s) 102 will maneuver (e.g., up-sun, down-wind, etc.). Next, a nominal stand-off distance ($d_0$) 168 from the target 160 is selected. Last, a desired coverage 170 is selected. Example coverages include greater than 0° to 180°, for example. The orientation 166, the nominal stand-off distance 168, and the coverage 170 are related to the design constants of the analytical formulation for distance k, a sizing of the lemniscate lobes a, and the relative location of the lemniscate and target $\{x_0, y_0\}$. The above formulation is positioned at the target 160, oriented relative to the target 160, and scaled based on the vehicle(s) 102 and payload capabilities.

Thus, within examples, the flight pattern 164 can be determined based on the angle of coverage 170 around the target 160, which may include determining a size of the lobes of the lemniscate.

As one example, the layout of FIG. 4 can be implemented in a graphical mission management system in a ground control station by an operator selecting or entering the target 160, selecting or entering a stand-off waypoint 172, and selecting the desired coverage 170. To size the stand-off pattern for the above example, the parameters a and k can be related in an example as follows. For example, select a nominal stand-off distance $d_0=1000$, and then compute $$k = \frac{4}{5}d_0, \quad a = \frac{1}{5}d_0,$$

and place the lemniscate at $\{x_0, y_0\} = \{0, a\}$. A bearing from the target 160 to the stand-off waypoint 172 orients the complete scenario.

For example, an algorithmic implementation may include the operator designating the stand-off waypoint $\{x_w, y_w\}$ relative to a target at $\{x_t, y_t\}$, and the nominal stand-off distance is computed as:

$$d_0 = \sqrt{(x_w - x_t)^2 + (y_w - y_t)^2} \quad \text{Equation (15)}$$

A bearing from the target is computed as:

$$X_t = \arctan_2\{(y_w - y_t), (x_w - x_t)\} \quad \text{Equation (16)}$$

where $\arctan_2$ refers to the four quadrant inverse tangent function.

The stand-off sizing parameters are computed as:

$$k = \frac{4}{5}d_0 \quad \text{Equation (17)}$$

$$a = \frac{1}{5}d_0 \quad \text{Equation (18)}$$

Then, the lemniscate is positioned at $\{x_0, y_0\}$ the target is located at $\{0, -a\}_p$.

Using the target location, the placement of the lemniscate is computed in the navigation frame, for example the local North-East-Down (NED) frame, as $$\begin{pmatrix} x_0 \\ y_0 \end{pmatrix}_{ned} = \begin{pmatrix} x_t \\ y_t \end{pmatrix}_{ned} - {}_{ned}R_p \begin{pmatrix} 0 \\ -a \end{pmatrix}_p \quad \text{Equation (19)}$$

where $$_{ned}R_p = \begin{pmatrix} \cos X_t & \sin X_t \\ -\sin X_t & \cos X_t \end{pmatrix} \quad \text{Equation (20)}$$

Finally, the stand-off scenario can be rotated to the desired bearing from the target. For example, if using a local NED navigation formulation, the pattern can be formed as $$\begin{pmatrix} x(s) \\ y(s) \end{pmatrix}_{ned} = \begin{pmatrix} x_0 \\ y_0 \end{pmatrix}_{ned} + {}_{ned}R_p \begin{pmatrix} x_p(s) \\ y_p(s) \end{pmatrix}_p \quad \text{Equation (21)}$$

Thus, within examples, the flight pattern 164 can be determined based on the orientation 166 of the flight pattern 164 relative to the target 160, based on the angle of coverage 170, or based on combinations of the orientation 166 and the coverage 170 as well.

Figure 5:
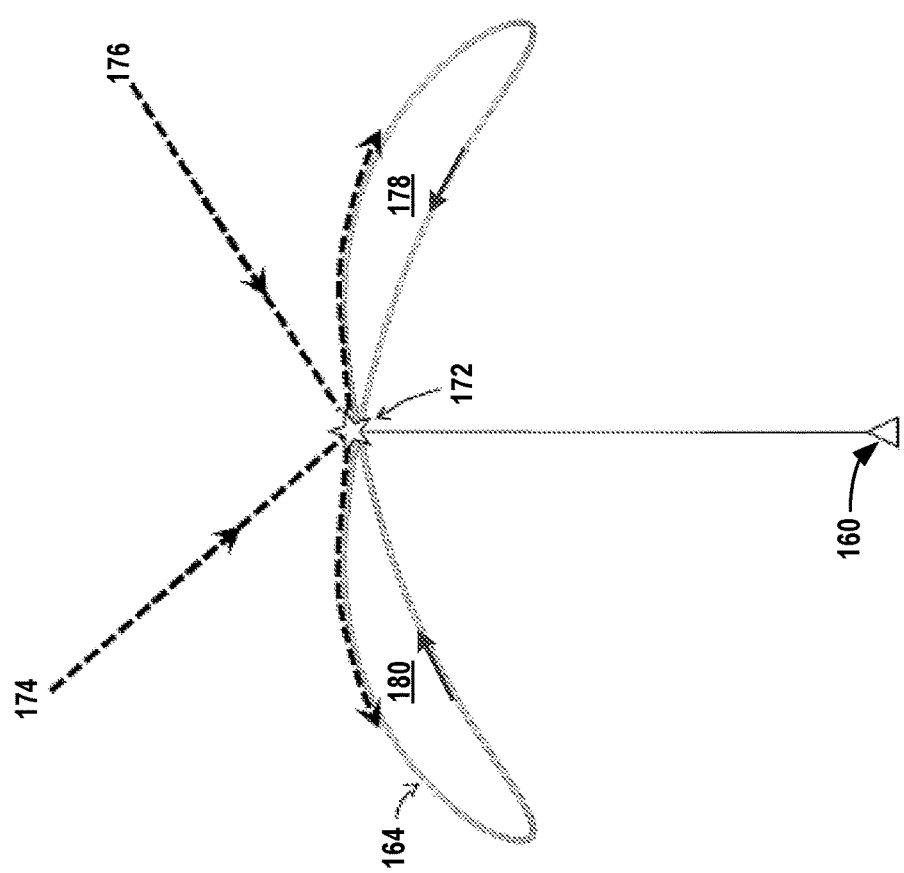
FIG. 5 illustrates an example approach path for the vehicle(s) towards and along the flight pattern, according to an example embodiment.

FIG. 5 illustrates an example approach path for the vehicle(s) 102 along the flight pattern 164, according to an example embodiment. In FIG. 5, the vehicle(s) 102 approach the stand-off waypoint from the North, and transitions to flight path tracking within a certain distance from the stand-off waypoint 172. FIG. 5 shows two alternate approach paths 174 and 176. The approach path 174 shows the vehicle(s) 102 approaching from the Northwest and traveling along the flight pattern 164 shown by the arrows by first traversing lobe 178 and then traversing lobe 180. The approach path 176 shows the vehicle(s) 102 approaching from the Northeast and traveling along the flight pattern 164 shown by the arrows by first traversing lobe 180 and then traversing lobe 178.

Figure 6:
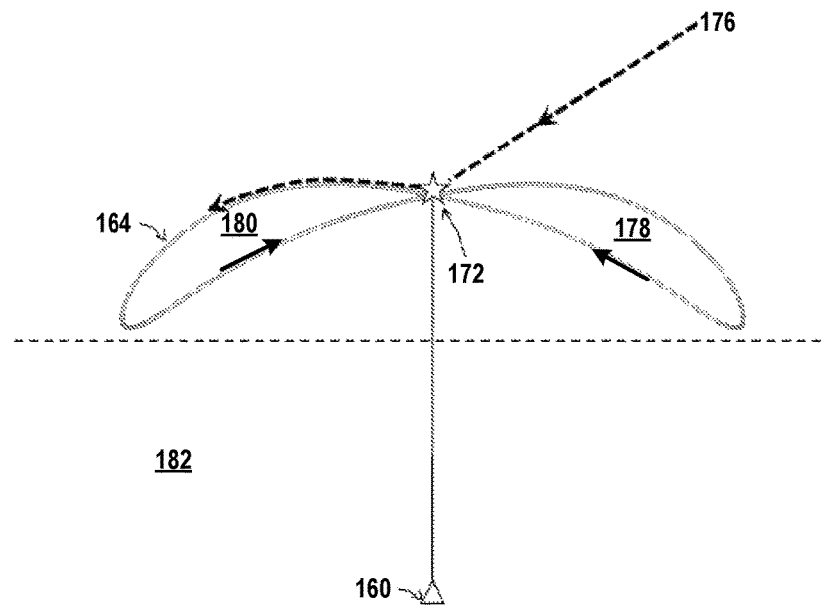
FIG. 6 illustrates an example approach path for the vehicle(s) towards and along the flight pattern with a no fly zone, according to an example embodiment.

FIG. 6 illustrates an example approach path for the vehicle(s) 102 along the flight pattern 164 with a no fly zone, according to an example embodiment. As shown in FIG. 6, an area proximate to the target 160 can be designated as a no-fly zone 182, and the flight pattern 164 in the form of the conchoidal transformation of the lemniscate can be based also on avoiding entering the designated no-fly zone 182.

Figure 7:
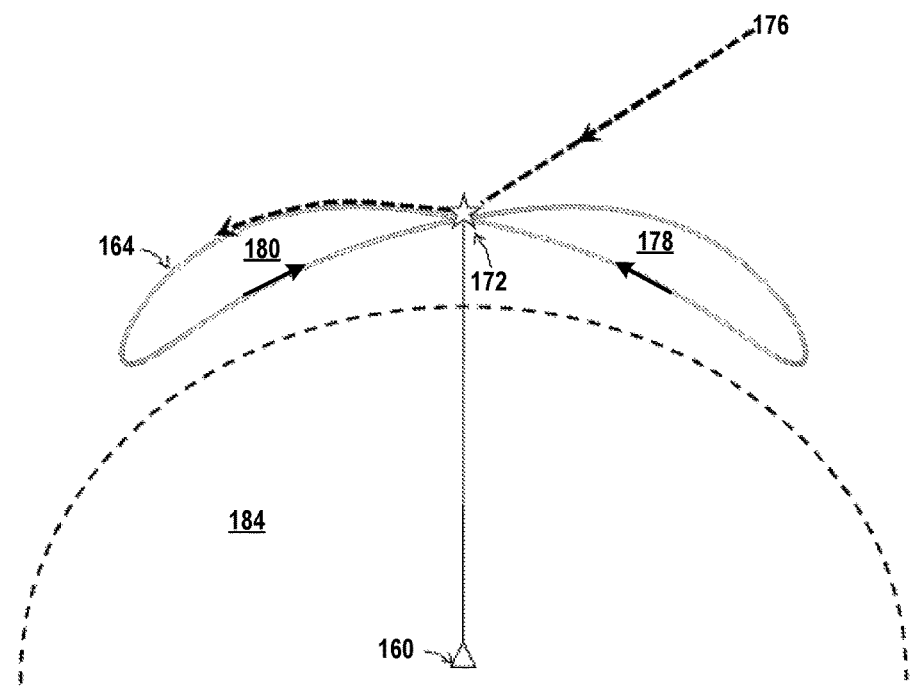
FIG. 7 illustrates another example approach path for the vehicle(s) towards and along the flight pattern with a no fly zone, according to an example embodiment.

FIG. 7 illustrates another example approach path for the vehicle(s) 102 along the flight pattern 164 with a no fly zone, according to an example embodiment. As shown in FIG. 7, another area proximate to the target 160 can be designated as a different no-fly zone 184, and the flight pattern 164 in the form of the conchoidal transformation of the lemniscate can be based also on avoiding entering the designated no-fly zone 184.

Guidance logic can be used to provide a path from a current location of the vehicle(s) 102 to the target 160 destination and return to recovery location. The flight pattern 164 can thus be combined with guidance based path following logic to navigate the vehicle(s) 102. Proportional navigation feedback can be used. If a path parameter "s" is driven by feedback of a position of the vehicle(s) 102 along the path, then the vehicle(s) pose (i.e., position and orientation) along the flight pattern 164 can be maintained as follows.

Given a desired pattern that can be parameterized as function of an independent parameter s, the path is then given by coordinates $\{x_p(s), y_p(s)\}$. The pattern can be used for the vehicle(s) 102 guidance, for example, by considering a frame Fs traveling along the desired path with a position given by parameter s. The speed and direction of the frame is related to the parameter s as follows.

$$V_s = \dot{s}\sqrt{\left(\frac{dx_p}{ds}\right)^2 + \left(\frac{dy_p}{ds}\right)^2} \quad \text{Equation (22)}$$

and $$X_s = \arctan_2\left(\frac{dy_p}{ds}, \frac{dx_p}{ds}\right) \quad \text{Equation (23)}$$

The frame Fs is defined to have an $x_s$-axis oriented along the velocity $\vec{V}_s$, and $z_s$-axis down and $y_s$-axis in a right handed orientation. Thus, the frame Fs is implicitly defined in the horizontal plane by $$\vec{V}_s = \begin{pmatrix} V_s \\ 0 \end{pmatrix}_s \quad \text{Equation (24)}$$

Progression along the path is given by:

$$\dot{s} = \frac{V_s}{\sqrt{\left(\frac{dx_p}{ds}\right)^2 + \left(\frac{dy_p}{ds}\right)^2}} \quad \text{Equation (25)}$$

The position of Fs along the desired path is indicated by parameter s, that is by integration of Equation (25). Numerical integration can for example be accomplished with $$s_{k+1} = s_k \dot{s}_k \Delta_t \quad \text{Equation (26)}$$

with $\Delta_t$ a sufficiently small integration time step and where s0 is a desired starting point in the pattern. Let $\{x_s, y_s\}$ represent the position of the vehicle(s) 102 in Fs. Given s, the set $\{x_s, y_s, X_s\}$ is computed as follows. Let the distance to the target be defined as $$r \triangleq \{(f-x_0)^2 + (g-y_0)^2\}^{1/2} \quad \text{Equation (27)}$$

The derivatives of f; g; r with respect to the parameter s are $$f' = -a\sin(s)\frac{3 - \sin^2(s)}{(1 + \sin^2(s))^2} \quad \text{Equation (28)}$$

$$g' = a\frac{1 - 3 - \sin^2(s)}{(1 + \sin^2(s))^2} \quad \text{Equation (29)}$$

$$r' = \frac{(f - x_0)f^1 + (g - y_0)g^1}{r} \quad \text{Equation (30)}$$

The derivatives of the position coordinates of the stand-off pattern are $$x'_p = f' + k\left\{\frac{rf' - (f - x_0)r'}{r^2}\right\} \quad \text{Equation (31)}$$

$$y'_p = g' + k\left\{\frac{rg' - (g - y_0)r'}{r^2}\right\} \quad \text{Equation (32)}$$

The desired course on the curve is then obtained from $$X_s = \arctan_2(y_p', x_p') \quad \text{Equation (33)}$$

where arctan$_2$ indicates the four quadrant arc tangent solution.

By the above construction, if the frame Fs is located by the parameter s, then the vehicle(s) 102 is located in the frame as $$\begin{pmatrix} x_s \\ y_s \end{pmatrix} = {}_sR_{ned}(X_s(s)) \times \begin{pmatrix} x_{av} - x_p(s) \\ y_{av} - y_p(s) \end{pmatrix} \quad \text{Equation (34)}$$

One example of a projection used in construction of guidance is to define Fs as the Serret-Frenet frame. The vehicle(s) 102 is located in the Serret-Frenet frame as $x_s = 0$ (by definition) and $$y_s = [0 \ 1] \times {}_sR_{ned}(X_s)\begin{pmatrix} x_{av} - x_p \\ y_{av} - y_p \end{pmatrix} \quad \text{Equation (35)}$$

Figure 8:
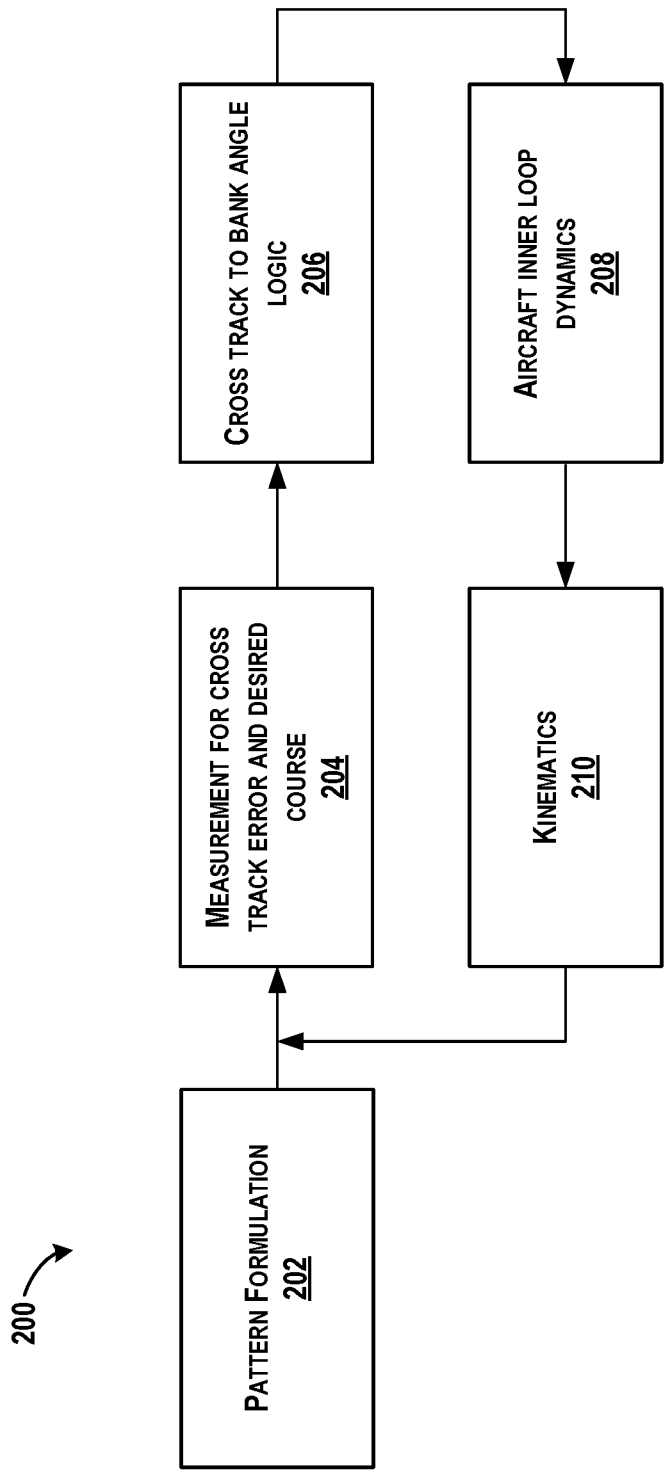
FIG. 8 is an example flow diagram for an example GNC sequence for the flight pattern, according to an example embodiment.

FIG. 8 is an example flow diagram for an example GNC sequence 200 for the flight pattern 164, according to an example embodiment. Initially, at block 202, a pattern formulation is performed using Equations (12)-(14), for example. Following, measurement for cross track error and desired course of the vehicle(s) 102 is performed, as shown at block 204. The cross track error refers to the vehicle(s) 102 deviating from the flight pattern 164 and a desired course is how to steer to the vehicle(s) 102 back to a center line of the flight pattern 164. An example course measurement can be determined using Equation (33), and an example cross-track error measurement can be determined using Equation (34).

Next, a cross track to bank angle logic is executed, as shown at block 206, to determine banking of the vehicle(s) 102 to adhere to the desired course, for example. At block 208, aircraft inner loop dynamics are performed to steer the vehicle(s) 102 along the desired course. Functions of blocks 206 and 208 may be performed by the vehicle(s) 102, for example.

Next, kinematics 210 of the vehicle(s) 102 are considered in the feedback loop. The kinematics refers to limits of what the vehicle(s) 102 can do during flight. Some air vehicles may not be able to follow certain patterns. A parametric formulation of stand-off patterns can be used to predict air vehicle and payload performance a-priori, and adapt the stand-off pattern to optimize payload perspective. For example, by combining the stand-off pattern formulation with a kinematic model of a vehicle capable of coordinated turns and expressed with effects of wind:

$$\dot{x}_N = V_a \cos\psi + w_N \quad \text{Equation (36)}$$

$$\dot{y}_E = V_a \sin\psi + w_E \quad \text{Equation (37)}$$

$$\dot{V}_g = g\sin(X - \psi)u \quad \text{Equation (38)}$$

$$\dot{X} = \frac{g}{V_g}\cos(X - \psi)u \quad \text{Equation (39)}$$

$$\dot{\psi} = \frac{g}{V_a}u \quad \text{Equation (40)}$$

where $\{x_N, y_E\}$ is the vehicle position, $\{w_N, w_E\}$ is wind speed towards North and East, $V_a$ is speed relative to air mass, Vg is the speed over ground, X is the course, $\psi$ is the vehicle heading, and where the control input u is based on the commanded bank angle as u=tan φ with bank angle limited to |φ|≤φ$_{max}$. Equations (36)-(40) can be used to determine kinematics of the vehicle(s) 102, and the GNC sequence 200 can be executed to provide iterative signal flow for a predictor which can be applied for such optimization. Payload performance can be assessed by relating the vehicle(s) 102 kinematics to gimballed geometry and kinematics of specific equipment onboard the vehicle(s) 102, and an assessment against the estimated wind speed and direction.

Figure 9:
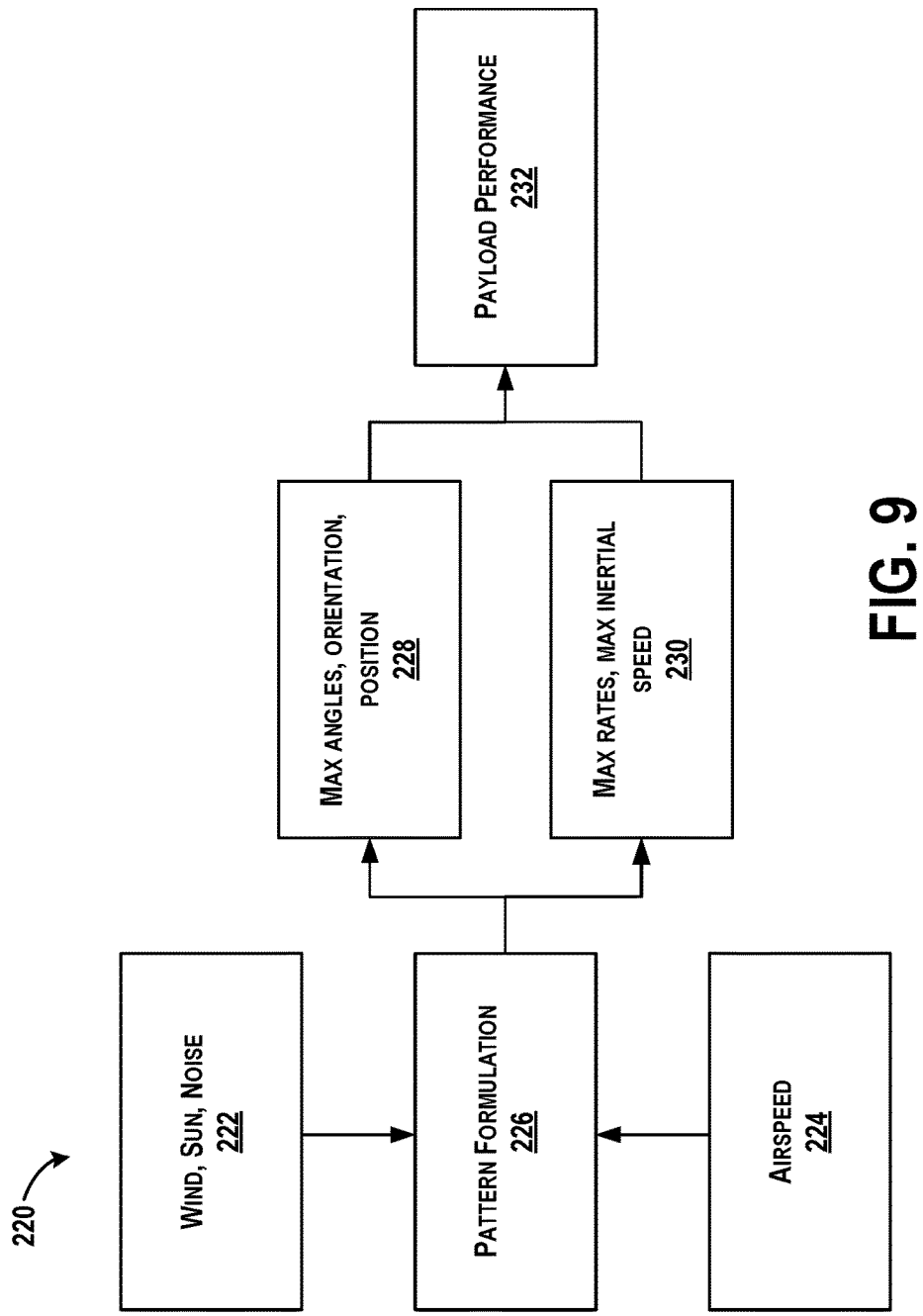
FIG. 9 is an example flow diagram for dynamics and payload limits associated with the flight pattern, according to an example embodiment.

FIG. 9 is an example flow diagram 220 for dynamics associated with the flight pattern 164, according to an example embodiment which predicts the performance of payload sensor(s) 108. Initially, at block 222, wind, sun, and noise inputs are considered. For example, if it is windy, the vehicle(s) 102 may need to compensate to fly into the wind so as to follow the flight pattern 164. As another example, based on positioning of the sun or time of day, the vehicle(s) 102 and/or the flight pattern 164 can be positioned appropriately so that a camera does not look directly into sun. Thus, orientation of the flight pattern 164 relative to the target 160 can consider determining an up-sun position of the flight pattern 164 relative to the target 160, determining an up-wind position of the flight pattern 164 relative to the target 160, or determining a down-wind position of the flight pattern 164 relative to the target 160.

As shown at block 224, airspeed of the vehicle(s) 102 is input, and then as block 226, the flight pattern 164 is formed, for example. At block 228, maximum angles, orientation, and position of the vehicle(s) 102 is considered, and at block 230, maximum rates and maximum inertial speeds are considered. A payload performance is also considered, at block 232. These dynamics enable determination a priori of whether the vehicle(s) 102 can execute the desired flight pattern 164. Thus, predicting performance of the vehicle(s) along the generated flight pattern 164 can consider one or more of a kinematic model of the vehicle(s), as well as wind conditions, a position of the sun relative to the vehicle(s), and a noise output of the vehicle(s) 102 while flying along the generated flight pattern 164.

Figure 10:
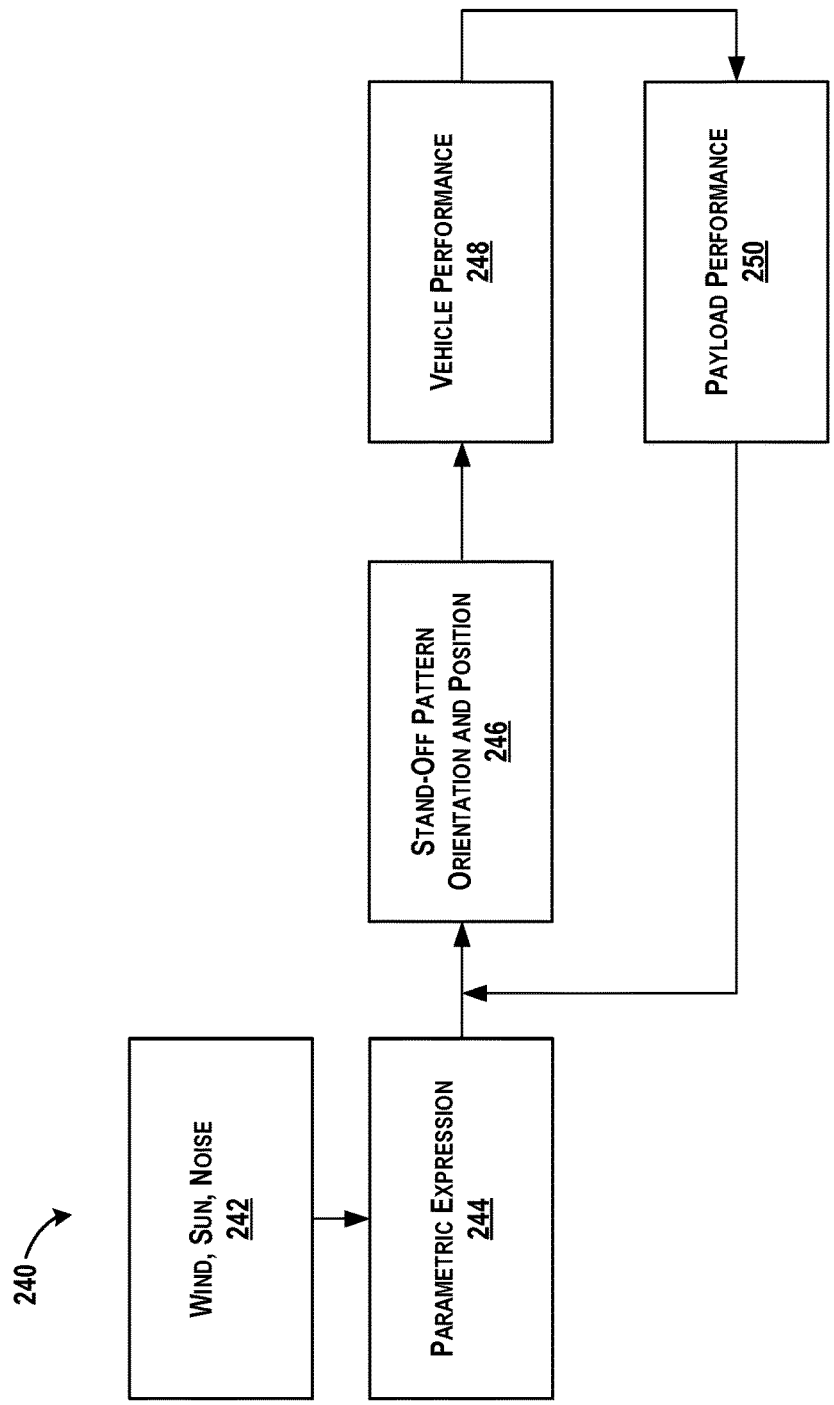
FIG. 10 is an example flow diagram for optimization of the flight pattern, according to an example embodiment.

FIG. 10 is an example flow diagram 240 for optimization of the flight pattern 164, according to an example embodiment which adjusts flight pattern 164 to improve the performance of payload sensor(s) 108. Initially, at block 242, the wind, sun, and noise patterns are considered, and at block 244, the parametric values for the flight pattern 164 are determined. At block 246, the stand-off pattern orientation and position are determined, and the vehicle(s) 102 performance as well as payload sensor(s) 108 performance can be predicted as shown at blocks 248 and 250, and its result can then be used to further modify the flight pattern 164 to improve the predicted performance of the vehicle(s) 102 and payload sensor(s) 108.

Figure 11:
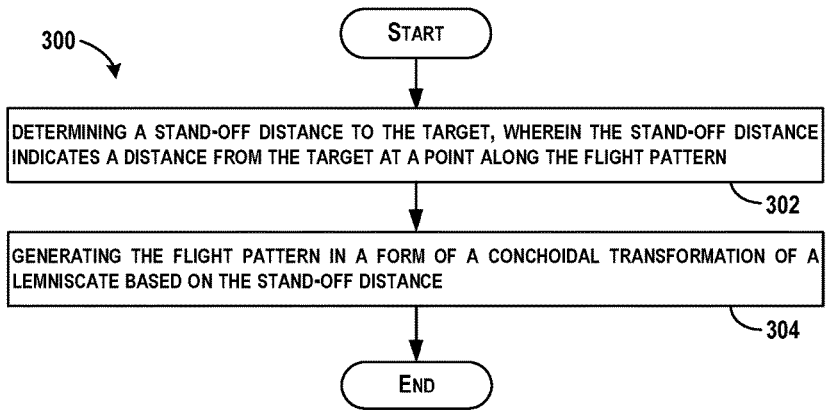
FIG. 11 shows a flowchart of an example method of establishing the flight pattern adjacent to the target for the aerial vehicle(s) to follow, according to an example embodiment.

FIG. 11 shows a flowchart of an example method 300 of establishing the flight pattern 164 adjacent to the target 160 for the aerial vehicle(s) 102 to follow, according to an example embodiment. Method 300 shown in FIG. 11 presents an embodiment of a method that could be used with the system 100 shown in FIG. 1, the computing device 104 shown in FIG. 1, and/or the control center 152 shown in FIG. 2, for example. Further, devices or systems may be used or configured to perform logical functions presented in FIG. 11. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 302-304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 11, and within other processes and methods disclosed herein, may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes determining a stand-off distance 168 to the target 160, and the stand-off distance 168 indicates a distance from the target 160 at a point along the flight pattern 164.

At block 304, the method 300 includes generating the flight pattern 164 in a form of a conchoidal transformation of a lemniscate based on the stand-off distance. As described, the lemniscate may include a lemniscate of Bernouilli or a lemniscate of Gerono. Within examples, the flight pattern 164 is generated to resemble a flattened figure-eight pattern.

Figure 12:
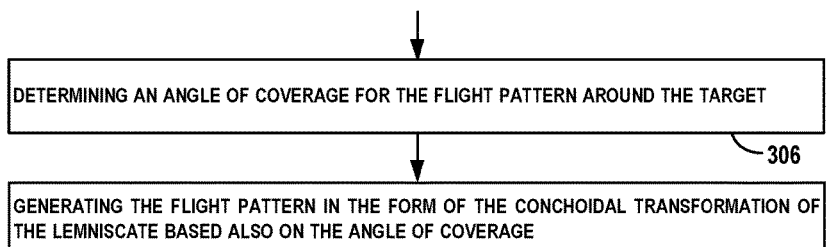
FIG. 12 shows a flowchart of an example method for use with the method shown in FIG. 11, according to an example embodiment.

FIG. 12 shows a flowchart of an example method for use with the method 300, according to an example embodiment. At block 306, functions include determining an angle of coverage 170 for the flight pattern 164 around the target 160. At block 308, functions include generating the flight pattern 164 in the form of the conchoidal transformation of the lemniscate based also on the angle of coverage 170. Determining the angle of coverage 170 can include determining a size of lobes of the lemniscate, for example.

Figure 13:
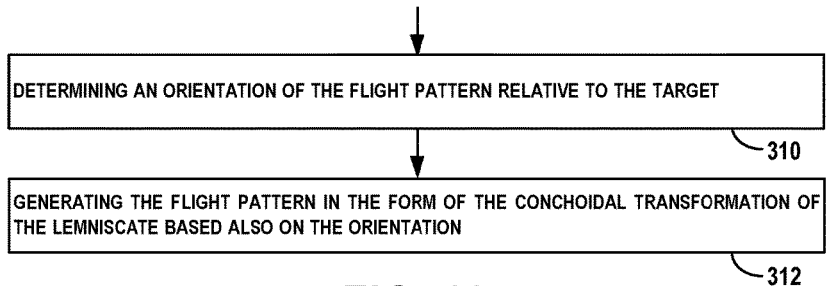
FIG. 13 shows a flowchart of another example method for use with the method shown in FIG. 11, according to an example embodiment.

FIG. 13 shows a flowchart of another example method for use with the method 300, according to an example embodiment. At block 310, functions include determining the orientation 166 of the flight pattern 164 relative to the target 160. At block 312, functions include generating the flight pattern 164 in the form of the conchoidal transformation of the lemniscate based also on the orientation 166.

FIG. 14 shows a flowchart of another example method for use with the method 300, according to an example embodiment. At block 314, functions include determining an up-sun position of the flight pattern 164 relative to the target 160.

FIG. 15 shows a flowchart of another example method for use with the method 300, according to an example embodiment. At block 316, functions include determining an up-wind position of the flight pattern 164 relative to the target 160.

FIG. 16 shows a flowchart of another example method for use with the method 300, according to an example embodiment. At block 318, functions include determining a downwind position of the flight pattern 164 relative to the target 160.

FIG. 17 shows a flowchart of another example method for use with the method 300, according to an example embodiment. At block 320, functions include designating an area proximate to the target as a no-fly zone 182/184. At block 322, functions include generating the flight pattern 164 in the form of the conchoidal transformation of the lemniscate based also on avoiding entering the designated no-fly zone 182/184.

FIG. 18 shows a flowchart of another example method for use with the method 300, according to an example embodiment. At block 324, functions include sending, by the computing device 104, instructions to the vehicle(s) 102 indicating to fly the generated flight pattern 164 so as to follow a path enabling continuous coverage of the target 160 from a nose mounted sensor 108 on the vehicle(s) 102.

FIG. 19 shows a flowchart of another example method for use with the method 300, according to an example embodiment. At block 326, functions include receiving, at the input interface 132, a change to the stand-off distance 168. At block 328, functions include modifying the generated flight pattern 164 in real time based on the change to the stand-off distance 168. Real time processing means that the processor(s) 130 perform the actions during flight. The real time processing may continually process data to determine whether the vehicle(s) 102 are following the flight pattern 164 in order to make adjustments, Put another way, the real time aspect includes deciding to modify the flight pattern 164 substantially immediately upon receiving the change to the stand-off distance 168. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 20:
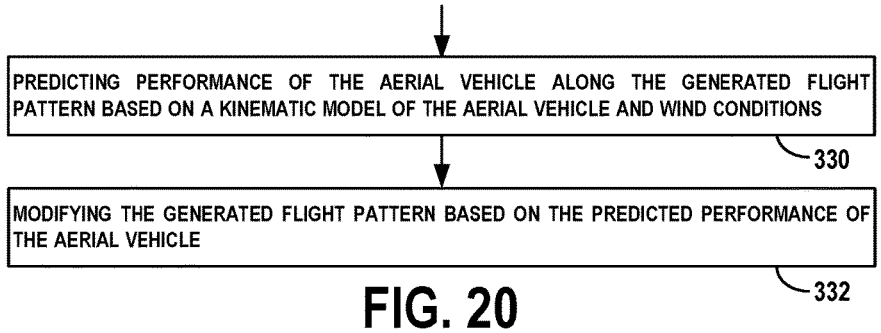
FIG. 20 shows a flowchart of another example method for use with the method shown in FIG. 11, according to an example embodiment.

FIG. 20 shows a flowchart of another example method for use with the method 300, according to an example embodiment. At block 330, functions include predicting performance of the vehicle(s) 102 along the generated flight pattern 164 based on a kinematic model of the vehicle(s) 102 and wind conditions. At block 332, functions include modifying the generated flight pattern 164 based on the predicted performance of the vehicle(s) 102.

Figure 21:
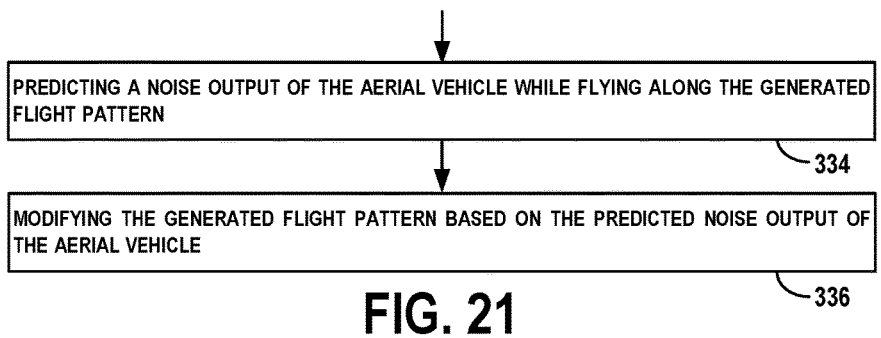
FIG. 21 shows a flowchart of another example method for use with the method shown in FIG. 11, according to an example embodiment.

FIG. 21 shows a flowchart of another example method for use with the method 300, according to an example embodiment. At block 334, functions include predicting a noise output of the vehicle(s) 102 while flying along the generated flight pattern 164. At block 336, functions include modifying the generated flight pattern 164 based on the predicted noise output of the vehicle(s) 102.

Figure 22:
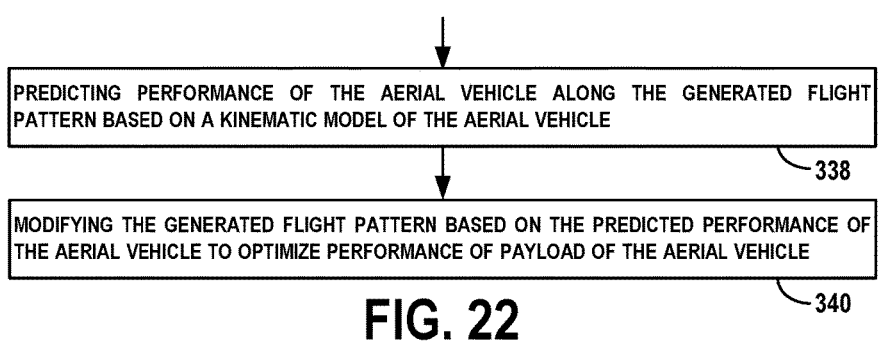
FIG. 22 shows a flowchart of another example method for use with the method shown in FIG. 11, according to an example embodiment.

FIG. 22 shows a flowchart of another example method for use with the method 300, according to an example embodiment. At block 338, functions include predicting performance of the vehicle(s) 102 along the generated flight pattern 164 based on a kinematic model of the vehicle(s) 102. At block 340, functions include modifying the generated flight pattern 164 based on the predicted performance of the vehicle(s) 102 to optimize performance of payload of the vehicle(s) 102.

Figure 23:
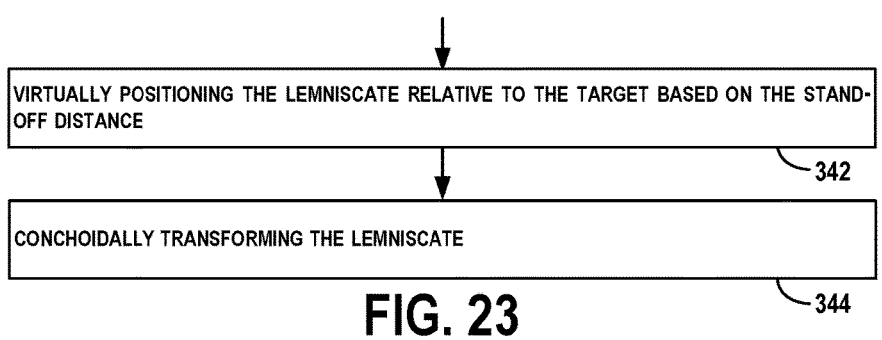
FIG. 23 shows a flowchart of another example method for use with the method shown in FIG. 11, according to an example embodiment.

FIG. 23 shows a flowchart of another example method for use with the method 300, according to an example embodiment. At block 342, functions include virtually positioning the lemniscate relative to the target 160 based on the stand-off distance 168. At block 344, functions include conchoidally transforming the lemniscate.

Examples described herein offer a predictable stand-off observation capability that can be shaped by the operator and accommodates a nose mounted payload. This ability can be integrated within existing algorithms and reduces a need for heuristics in coding, thereby reducing potential for software errors and reducing work required for software quality control. Within examples, the flight pattern 164 can be shaped based on predicted sound patterns, shaped to guarantee an up-sun position for the vehicle(s) 102 (e.g., to avoid sun light reflection), and shaped for continued coverage. Another example benefit with this flight pattern 164 generation is to combine this analytical expression with a kinematic model to make prediction of whether the vehicle(s) 102 can do what is asked in the environmental conditions.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of establishing a flight pattern adjacent to a target for an aerial vehicle to follow, comprising:
   determining a stand-off distance to the target, wherein the stand-off distance indicates a distance from the target at a point along the flight pattern; and
   generating the flight pattern in a form of a conchoidal transformation of a lemniscate based on the stand-off distance.

2. The method of claim 1, wherein the lemniscate comprises a lemniscate of Bernouilli or a lemniscate of Gerono.

3. The method of claim 1, wherein generating the flight pattern in the form of the conchoidal transformation of the lemniscate based on the stand-off distance comprises:
   generating the flight pattern to resemble a flattened figure-eight pattern.

4. The method of claim 1, further comprising:
   determining an angle of coverage for the flight pattern around the target; and generating the flight pattern in the form of the conchoidal transformation of the lemniscate based also on the angle of coverage.

5. The method of claim 4, wherein generating the flight pattern in the form of the conchoidal transformation of the lemniscate based also on the angle of coverage comprises:
determining a size of lobes of the lemniscate.

6. The method of claim 1, further comprising:
determining an orientation of the flight pattern relative to the target; and
generating the flight pattern in the form of the conchoidal transformation of the lemniscate based also on the orientation.

7. The method of claim 6, wherein determining the orientation of the flight pattern relative to the target comprises:
determining an up-sun position of the flight pattern relative to the target.

8. The method of claim 6, wherein determining the orientation of the flight pattern relative to the target comprises:
determining an up-wind position of the flight pattern relative to the target.

9. The method of claim 6, wherein determining the orientation of the flight pattern relative to the target comprises:
determining a down-wind position of the flight pattern relative to the target.

10. The method of claim 1, further comprising:
designating an area proximate to the target as a no-fly zone; and
generating the flight pattern in the form of the conchoidal transformation of the lemniscate based also on avoiding entering the designated no-fly zone.

11. The method of claim 1, further comprising:
sending, by a computing device, instructions to the aerial vehicle indicating to fly the generated flight pattern so as to follow a path enabling continuous coverage of the target from a nose mounted sensor on the aerial vehicle.

12. The method of claim 1, further comprising:
receiving, at an input interface, a change to the stand-off distance; and
modifying the generated flight pattern in real time based on the change to the stand-off distance.

13. The method of claim 1, further comprising:
predicting performance of the aerial vehicle along the generated flight pattern based on a kinematic model of the aerial vehicle and wind conditions; and
modifying the generated flight pattern based on the predicted performance of the aerial vehicle.

14. The method of claim 1, further comprising:
predicting a noise output of the aerial vehicle while flying along the generated flight pattern; and
modifying the generated flight pattern based on the predicted noise output of the aerial vehicle.

15. The method of claim 1, further comprising:
predicting performance of the aerial vehicle along the generated flight pattern based on a kinematic model of the aerial vehicle; and
modifying the generated flight pattern based on the predicted performance of the aerial vehicle to optimize performance of payload of the aerial vehicle.

16. The method of claim 1, wherein the method is performed by a computing device having one or more processors, and the method further comprises:
virtually positioning the lemniscate relative to the target based on the stand-off distance; and
conchoidally transforming the lemniscate.

17. A non-transitory computer readable storage medium having stored therein instructions, that when executed by a system having one or more processors, causes the system to perform functions of establishing a flight pattern adjacent to a target for an aerial vehicle to follow, the functions comprising:
determining a stand-off distance to the target, wherein the stand-off distance indicates a distance from the target at a point along the flight pattern; and
generating the flight pattern in a form of a conchoidal transformation of a lemniscate based on the stand-off distance.

18. The non-transitory computer readable medium of claim 17, wherein the functions further comprise:
determining an angle of coverage for the flight pattern around the target;
determining an orientation of the flight pattern relative to the target; and
generating the flight pattern in the form of the conchoidal transformation of the lemniscate based also on the angle of coverage and the orientation of the flight pattern relative to the target.

19. A computing device comprising:
a communication interface for receiving a stand-off distance to a target, wherein the stand-off distance indicates a distance from the target at a point along a flight pattern adjacent to the target for an aerial vehicle to follow; and
one or more processors for executing instructions stored on data storage to generate the flight pattern in a form of a conchoidal transformation of a lemniscate based on the stand-off distance.

20. The computing device of claim 19, further comprising:
an output interface for sending instructions to the aerial vehicle indicating to fly the generated flight pattern so as to follow a path enabling continuous coverage of the target from a nose mounted sensor on the aerial vehicle.

* * * * *